US012791693B2

(12) United States Patent
Tertinek et al.

(10) Patent No.: US 12,791,693 B2
(45) Date of Patent: Nov. 10, 2026

(54) SYSTEMS AND METHODS FOR FACILITATING GUIDING A VEHICLE TO A PREDEFINED LOCATION

(71) Applicant: NXP B.V., Eindhoven (NL)

(72) Inventors: Stefan Tertinek, Graz (AT); Bernhard Großwindhager, Graz (AT)

(73) Assignee: NXP B.V., Eindhoven (NL)

( * ) Notice: Subject to any disclaimer, the term of this patent is extended or adjusted under 35 U.S.C. 154(b) by 534 days.

(21) Appl. No.: 17/808,839

(22) Filed: Jun. 24, 2022

(65) Prior Publication Data

US 2023/0003864 A1 Jan. 5, 2023

(30) Foreign Application Priority Data

Jul. 1, 2021 (EP) .................................... 21183282

(51) Int. Cl.
*G01S 13/02* (2006.01)
*G01C 21/34* (2006.01)
*G01S 13/06* (2006.01)

(52) U.S. Cl.
CPC .......... *G01S 13/0209* (2013.01); *G01C 21/34* (2013.01); *G01S 13/06* (2013.01)

(58) Field of Classification Search
CPC ...... G01S 13/0209; G01S 13/06; G01C 21/34
See application file for complete search history.

(56) References Cited

U.S. PATENT DOCUMENTS 9,114,720 B2 8/2015 Oman et al.
9,302,594 B2 4/2016 Tripathi et al.
9,772,401 B2 9/2017 Widmer et al.
11,942,984 B2 3/2024 Tertinek et al.
2014/0330449 A1* 11/2014 Oman .................. B60R 25/245 701/2
2017/0080962 A1* 3/2017 Kashima ............... B61L 23/041
2017/0174093 A1* 6/2017 Oettle ..................... G01S 13/88
2020/0164758 A1 5/2020 Flechi
2021/0271238 A1 9/2021 Ko et al.
2022/0067402 A1* 3/2022 An ......................... G06V 20/58

FOREIGN PATENT DOCUMENTS

WO 2020171317 A1 8/2020

OTHER PUBLICATIONS

Hartmann, F., "Design of an Embedded UWB Hardware Platform for Navigation in GPS Denied Environments", 2015 IEEE Symposium on Communications and Vehicular Technology in the Benelux (SCVT), Nov. 24, 2015.
Tiemann, J., "Ultra-wideband Aided Precision Parking for Wireless Power Transfer to Electric Vehicles in Real Life Scenarios", IEEE Vehicular Technology Conference (VTC-Fall), http://dx.doi.org/10.1109/VTCFall.2016.7881953, Sep. 2016.

* cited by examiner

*Primary Examiner* — Brady W Frazier
*Assistant Examiner* — Juliana Cross

(57) ABSTRACT

In accordance with a first aspect of the present disclosure, a system is provided for facilitating guiding a vehicle to a predefined location, said system configured to be included in a vehicle and comprising: one or more ultra-wideband (UWB) communication units configured to establish UWB communication with a UWB-enabled system installed at said predefined location; a controller configured to control said UWB communication units; wherein the controller is configured to cause the UWB communication units to switch between a communication mode of operation, a ranging mode of operation and a radar mode of operation.

18 Claims, 6 Drawing Sheets

SYSTEMS AND METHODS FOR FACILITATING GUIDING A VEHICLE TO A PREDEFINED LOCATION

CROSS-REFERENCE TO RELATED APPLICATIONS

This application claims the priority under 35 U.S.C. § 119 of European Patent application no. 21183282.9, filed on 1 Jul. 2021, the contents of which are incorporated by reference herein.

TECHNICAL FIELD

The present disclosure relates to systems for facilitating guiding a vehicle to a predefined location. Furthermore, the present disclosure relates to corresponding methods for facilitating guiding a vehicle to a predefined location, and to corresponding computer programs.

BACKGROUND

In various applications it may be necessary to guide vehicles to a predefined location in a correct and safe manner. For instance, automated charging systems for electric vehicles (EVs), which may be installed at such a predefined location, often require minimal driver interaction. To this end, the charging system should be equipped with a system to guide the vehicle to the charging unit. The guiding of the vehicle should be performed correctly and safely, in the sense that the vehicle is guided to the correct location and in the sense that no collisions occur between the vehicle and any external object or human being.

SUMMARY

In accordance with a first aspect of the present disclosure, a system is provided for facilitating guiding a vehicle to a predefined location, said system configured to be included in a vehicle and comprising: one or more ultra-wideband (UWB) communication units configured to establish UWB communication with a UWB-enabled system installed at said predefined location; a controller configured to control said UWB communication units; wherein the controller is configured to cause the UWB communication units to switch between a communication mode of operation, a ranging mode of operation and a radar mode of operation.

In one or more embodiments, the controller is further configured to cause the UWB communication units to operate in the communication mode in order to establish a connection with the UWB-enabled system.

In one or more embodiments, the controller is further configured to cause the UWB communication units to operate in the ranging mode in order to determine a position of the vehicle.

In one or more embodiments, the controller is further configured to calculate a path from the vehicle to the predefined location based on the determined position of the vehicle.

In one or more embodiments, the controller is further configured to cause the UWB communication units to operate in a combined ranging and radar mode in order to guide the vehicle to the predefined location.

In one or more embodiments, the combined ranging and radar mode includes alternating between the ranging mode of operation and the radar mode of operation.

In one or more embodiments, the controller is further configured to predict a collision between the vehicle and an external object based on a detection of said external object by the UWB communication units when said UWB communication units operate in the radar mode.

In accordance with a second aspect of the present disclosure, a method is conceived for facilitating guiding a vehicle to a predefined location, comprising: establishing, by one or more UWB communication units, UWB communication with a UWB-enabled system installed at said predefined location; controlling, by a controller, said UWB communication units, wherein the controller causes the UWB communication units to switch between a communication mode of operation, a ranging mode of operation and a radar mode of operation.

In accordance with a third aspect of the present disclosure, a computer program is provided, comprising executable instructions that, when executed by a system for facilitating guiding a vehicle to a predefined location, carry out or control a method of the kind set forth.

In accordance with a fourth aspect of the present disclosure, a system is provided for facilitating guiding a vehicle to a predefined location, said system configured to be installed at said predefined location and comprising: one or more UWB communication units configured to establish UWB communication with a UWB-enabled system included in said vehicle; a controller configured to control said UWB communication units; wherein the controller is configured to cause the UWB communication units to switch between a communication mode of operation, a ranging mode of operation and a radar mode of operation.

In one or more embodiments, the controller is further configured to cause the UWB communication units to operate in the communication mode in order to establish a connection with the UWB-enabled system.

In one or more embodiments, the controller is further configured to cause the UWB communication units to operate in the ranging mode in order to determine a position of the vehicle.

In one or more embodiments, the controller is further configured to cause the UWB communication units to operate in the radar mode in order to detect an external object which is present near or at the predefined location.

In accordance with a fifth aspect of the present disclosure, a method is conceived for facilitating guiding a vehicle to a predefined location, comprising: establishing, by one or more UWB communication units, UWB communication with a UWB-enabled system included in said vehicle; controlling, by a controller, said UWB communication units, wherein the controller causes the UWB communication units to switch between a communication mode of operation, a ranging mode of operation and a radar mode of operation.

In accordance with a sixth aspect of the present disclosure, a computer program is provided, comprising executable instructions that, when executed by a system for facilitating guiding a vehicle to a predefined location, carry out or control a method of the kind set forth.

DESCRIPTION OF DRAWINGS

Embodiments will be described in more detail with reference to the appended drawings, in which.

DESCRIPTION OF EMBODIMENTS

As mentioned above, in various applications it may be necessary to guide vehicles to a predefined location in a correct and safe manner. For instance, automated charging systems for electric vehicles (EVs), which may be installed at such a predefined location, often require minimal driver interaction. To this end, the charging system should be equipped with a system to guide the vehicle to the charging unit. The guiding of the vehicle should be performed correctly and safely, in the sense that the vehicle is guided to the correct location and in the sense that no collisions occur between the vehicle and any external object or human being.

Figure 1:
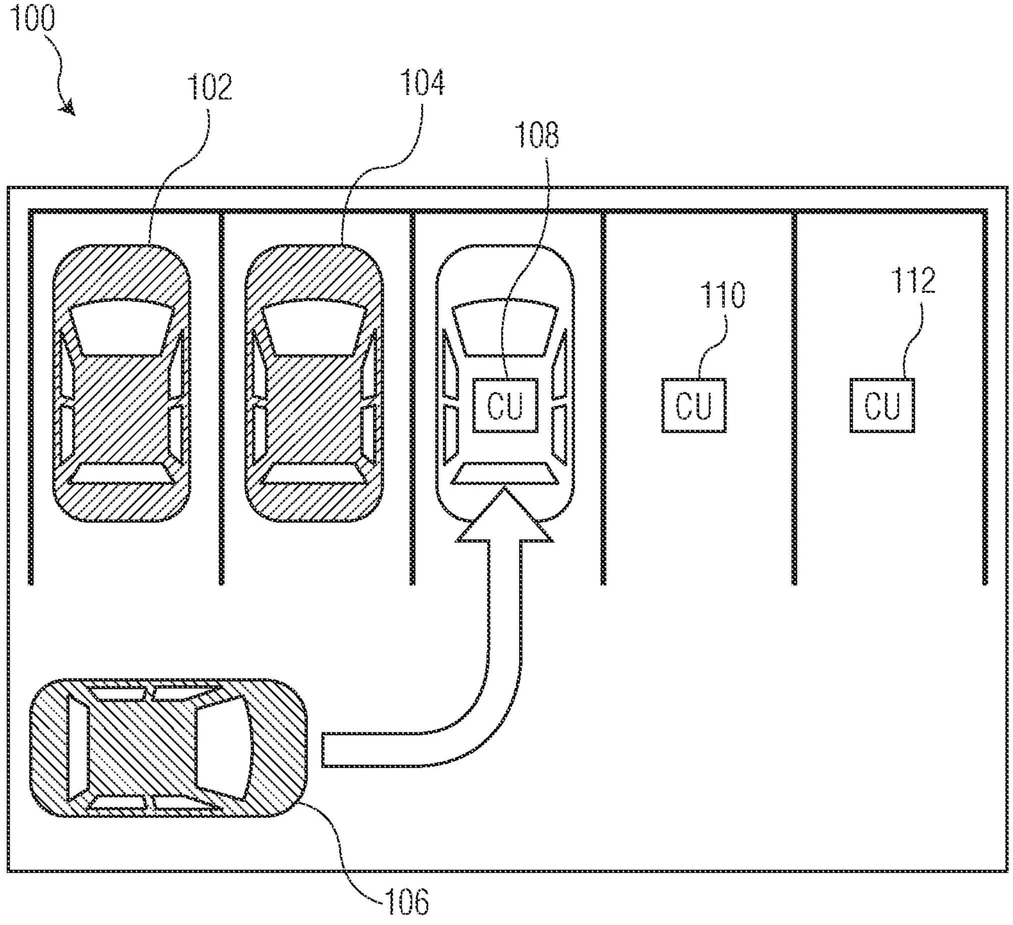
FIG. 1 shows an example of a vehicle charging site.

FIG. 1 shows an example of a vehicle charging site 100. As EVs and electric-hybrid vehicles are increasingly gaining market popularity, there is a need to develop automated charging systems which require minimal driver interaction and thus enable high driver comfort. Furthermore, such automatic charging stations may enable the widespread adoption of automated EVs and automated driving functions. A typical example is a fully automated park-and-charge system in a large parking facility, where a driver enters the facility and the automatic charging system establishes a wireless connection to the EV and guides it to the next free charging spot, either by providing directions on the driver's display or by taking full control of the EV (e.g. in case of autonomous EVs). Optionally, the driver can also select the desired charging unit. In FIG. 1, a plurality of charging units 108, 110, 112 is installed at different predefined locations. Furthermore, an approaching vehicle 106 should be guided to the predefined location at which the first charging unit 108 is installed.

In a scenario as shown in FIG. 1 the charging system should support different functions. For instance, a wireless connection should be established between the vehicle and the charging station, for the purposes of authorization, payment, and other transaction-related tasks. Furthermore, the vehicle should be localized to facilitate the execution of a guiding or routing procedure. In addition, the actual vehicle guiding should be performed, based on a planned path between the current position of the vehicle and the predefined location to which the vehicle should be guided. More specifically, based on the current position of the vehicle, the optimal route may be estimated, and the vehicle may be guided to the charging unit. The latter may require a continuous tracking of the vehicle's position relative to the charging unit. Besides the ranging feature of estimating the distance between multiple modules in the charging unit and the vehicle, the charging unit may also have to be capable of estimating the angle of arrival to refine the position estimation. An example of a UWB-based vehicle guiding system has been described in the article *Ultra-Wideband Aided Precision Parking for Wireless Power Transfer to Electric Vehicles in Real Life Scenarios*, written by Janis Tiemann et al. and published at the IEEE 84th Vehicular Technology Conference (VTC-Fall), 18-21 Sep. 2016.

Finally, a process such as radar-based vehicle sensing may have to be performed, in order to meet safety requirements. More specifically, a foreign body detection may have to performed, e.g. to detect a combustion engine vehicle blocking the charging unit or other obstacles hindering a successful charging procedure. Furthermore, a collision detection process should be executed, to detect potential collisions with objects or humans passing by. In case of a detection of a potential collision, the route should be recalculated.

Typically, these different functions are executed by different units or components integrated in the vehicle and the charging station. This, however, is not efficient in terms of resource usage. More specifically, a cost-efficient and space-efficient vehicle guiding system is desirable, which combines at least some of the above-mentioned functions in a single system or device at the side of the vehicle and a single system or device at the side of the predefined location to the which the vehicle should be guided (e.g. a charging station).

Now discussed are systems and methods for facilitating guiding a vehicle to a predefined location. In particular, said systems and methods facilitate combining the functions of connection establishment, vehicle localization, vehicle guiding and foreign object detection in a single system or device at the side of the vehicle and a single system or device at the side of the predefined location to the which the vehicle should be guided.

Figure 2:
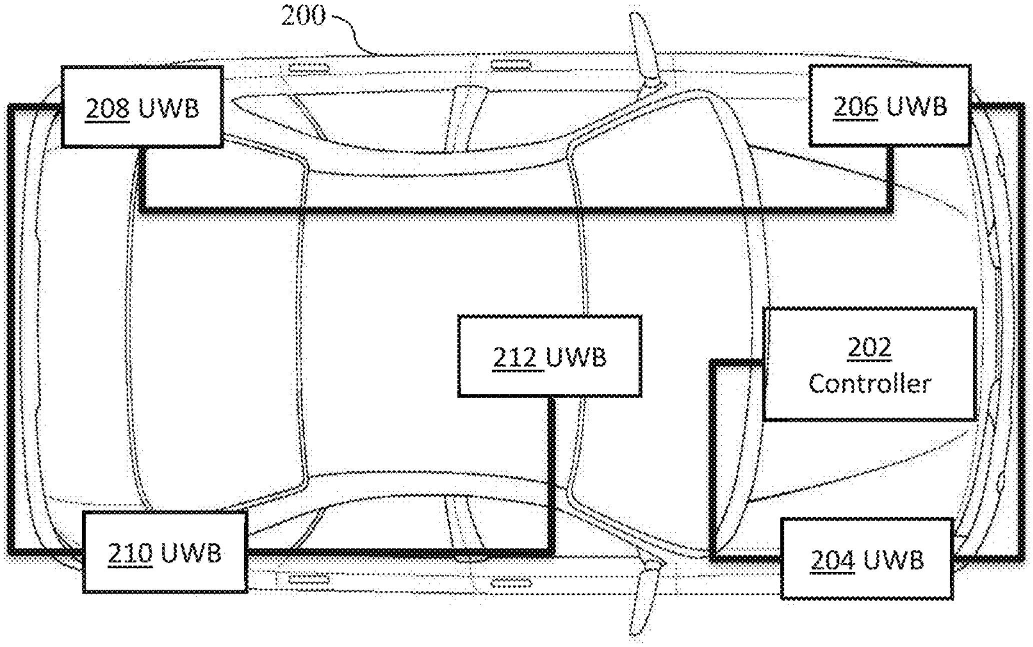
FIG. 2 shows an illustrative embodiment of a vehicle including a system for facilitating guiding the vehicle to a predefined location.

FIG. 2 shows an illustrative embodiment of a vehicle 200 including a system for facilitating guiding the vehicle to a predefined location. The system comprises a plurality of ultra-wideband (UWB) communication units 204, 206, 208, 210, 212 configured to establish UWB communication with a UWB-enabled system (not shown) installed at said predefined location. Furthermore, the system comprises a controller 202 configured to control said UWB communication units 204, 206, 208, 210, 212. In particular, the controller 202 is configured to cause the UWB communication units 204, 206, 208, 210, 212 to switch between a communication mode of operation, a ranging mode of operation and a radar mode of operation. In this way, various functions may be performed in a single system. For instance, the establishment of a connection—including the execution of authentication tasks and other transaction-related tasks—between the vehicle and the system installed at the predefined location may be performed when the UWB communication units 204, 206, 208, 210, 212 operate in the communication mode. Furthermore, the position of the vehicle may be determined when the UWB communication units 204, 206, 208, 210, 212 operate in the ranging mode. Furthermore, the vehicle may be properly guided to the predefined location while the UWB communication units 204, 206, 208, 210, 212 operate in the ranging mode and the radar mode, for example in a combined mode in which the ranging mode is alternated with the radar mode in order to track the position of the moving vehicle (in the ranging mode) and to detect objects in the projected path (in the radar mode), possibly followed by a recalculation of the path when one or more of such objects are detected. As explained below, operating in the ranging mode may also imply operating in an angle-of-arrival (AoA) mode, to determine a more accurate position of the vehicle.

Figure 3:
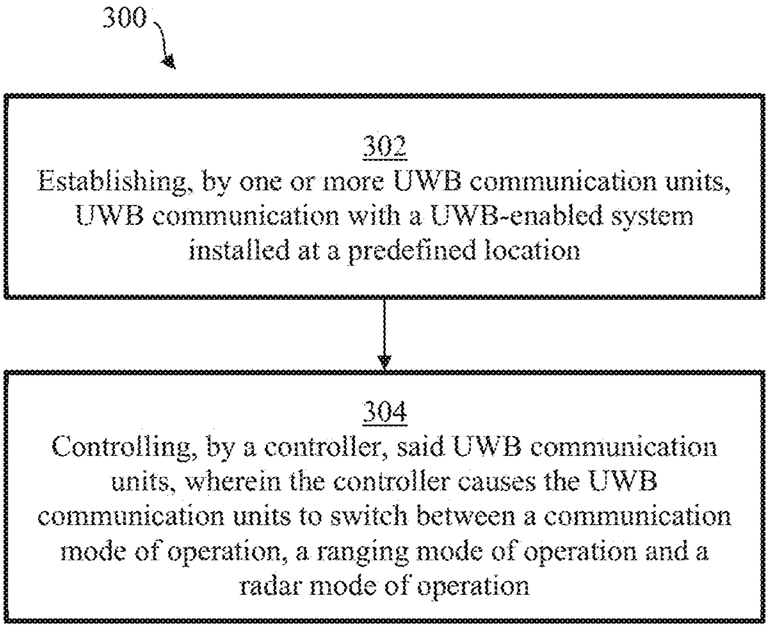
FIG. 3 shows an illustrative embodiment of a method for facilitating guiding a vehicle to a predefined location.

FIG. 3 shows an illustrative embodiment of a method 300 for facilitating guiding a vehicle to a predefined location, corresponding to the system included in the vehicle shown in FIG. 2. The method comprises, at 302, establishing, by one or more UWB communication units, UWB communication with a UWB-enabled system installed at a predefined location, and at 304, controlling, by a controller, said UWB communication units, wherein the controller causes the UWB communication units to switch between a communication mode of operation, a ranging mode of operation and a radar mode of operation. The method 300 facilitates performing various functions in a single system at the side of the vehicle, as explained above with reference to the corresponding system.

Figure 4:
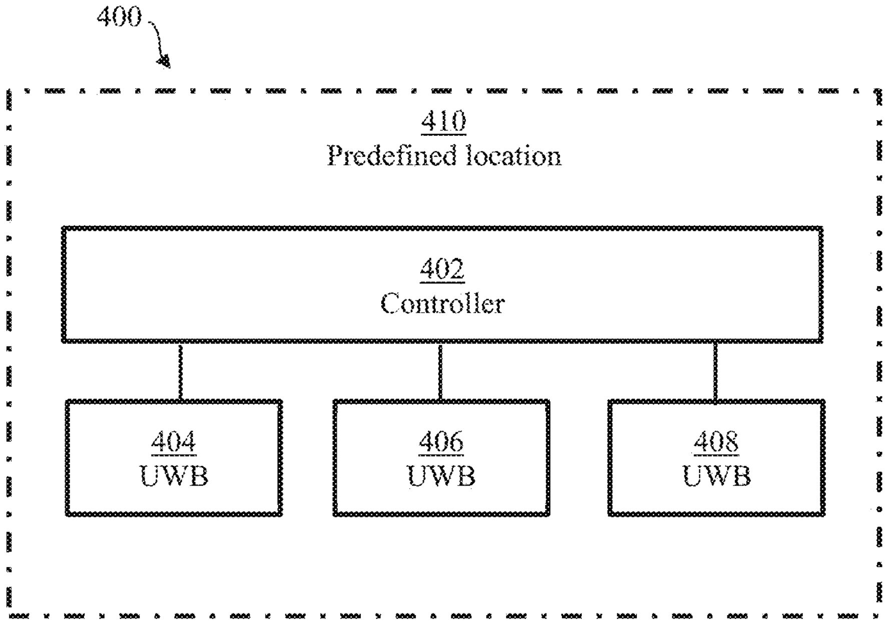
FIG. 4 shows an illustrative embodiment of a system for facilitating guiding a vehicle to a predefined location.

FIG. 4 shows an illustrative embodiment of a system 400 for facilitating guiding a vehicle to a predefined location 410. The system 400 comprises one or more UWB communication units 404, 406, 408 configured to establish UWB communication with a UWB-enabled system (not shown) included in said vehicle. Furthermore, the controller 402 is configured to control said UWB communication units 404, 406, 408. In particular, the controller 402 is configured to cause the UWB communication units 404, 406, 408 to switch between a communication mode of operation, a ranging mode of operation and a radar mode of operation. In this way, various functions may be performed in a single system. For instance, the establishment of a connection—including the execution of authentication tasks and other transaction-related tasks—between the vehicle and the system 400 may be performed when the UWB communication units 404, 406, 408 operate in the communication mode. Furthermore, the position of the vehicle may be determined when the UWB communication units 404, 406, 408 operate in the ranging mode. Furthermore, the vehicle may be properly guided to the predefined location while the UWB communication units 404, 406, 408 operate in the ranging mode and the radar mode, for example in a combined mode in which the ranging mode is alternated with the radar mode in order to track the position of the moving vehicle (in the ranging mode) and to detect objects in the projected path (in the radar mode), possibly followed by a recalculation of the path when one or more of such objects are detected. As explained below, operating in the ranging mode may also imply operating in an AoA mode, to determine a more accurate position of the vehicle.

Figure 5:
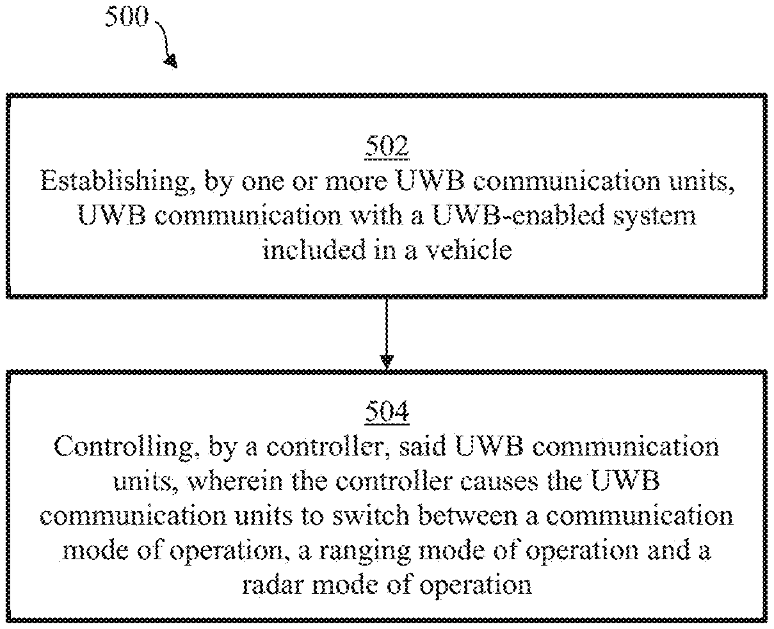
FIG. 5 shows another illustrative embodiment of a method for facilitating guiding a vehicle to a predefined location.

FIG. 5 shows another illustrative embodiment of a method 500 for facilitating guiding a vehicle to a predefined location, corresponding to the system installed at the predefined location shown in FIG. 4. The method 500 comprises, at 502, establishing, by one or more UWB communication units, UWB communication with a UWB-enabled system included in a vehicle, and at 504, controlling, by a controller, said UWB communication units, wherein the controller causes the UWB communication units to switch between a communication mode of operation, a ranging mode of operation and a radar mode of operation. The method 500 facilitates performing various functions in a single system at the side of the predefined location, as explained above with reference to the corresponding system.

UWB is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The AoA mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode. As used in this description, the ranging mode of operation may therefore be extended to include the AoA mode of operation, in the sense that when a device operates in the ranging mode, it may optionally perform additional operations which are typically performed in the AoA mode of operation.

In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The radar mode of operation may be used to advantage to detect (i.e., sense) the presence of objects or human beings. The skilled person will appreciate that the given examples are non-limiting examples of how the different modes of operation can be implemented. In other words, the modes may be implemented differently, depending on the requirements imposed by the application, for example.

In accordance with the present disclosure, various functions may be integrated in a single system or device at the side of the vehicle and at the side of the predefined location. More specifically, the main functions of (i) communication, (ii) localization/ranging, (iii) path planning, and (iv) sensing/radar may be integrated in a single system or device. This is achieved by causing the UWB communication units of said system or device to switch between a communication mode of operation, a ranging mode of operation and a radar mode of operation. In particular, these different modes of operation support the aforementioned different functions. Accordingly, a cost-efficient and space-efficient charging control unit may be realized, allowing the widespread adoption of automatic EV charging systems. Furthermore, an already existing smart car access infrastructure in the vehicle may be reused for the purpose of vehicle guiding and collision detection. More specifically, the aforementioned UWB communication units may be the same units as used for smart access applications. For instance, to enable these smart access applications, UWB anchors are typically already integrated into vehicles. Accordingly, the existing infrastructure in the vehicles may be reused and the value and purpose of UWB-enabled anchors within the vehicles may be increased.

For instance, in a charging station use case, both a vehicle and a charging station may contain a guiding and sensing system including UWB-enabled modules that can be configured to operate in a communication mode and ranging mode for localizing and guiding the vehicle, and in a radar mode (i.e., a sensing mode) for foreign body detection and collision detection and avoidance. Furthermore, both the vehicle and the charging station may contain control units, which may comprise algorithms for path planning, collision detection, and foreign body detection. Furthermore, these control units may configure the UWB mode depending on the state of the guidance procedure and recalculate the vehicle path depending on the output of the detection algorithms.

Figure 6:
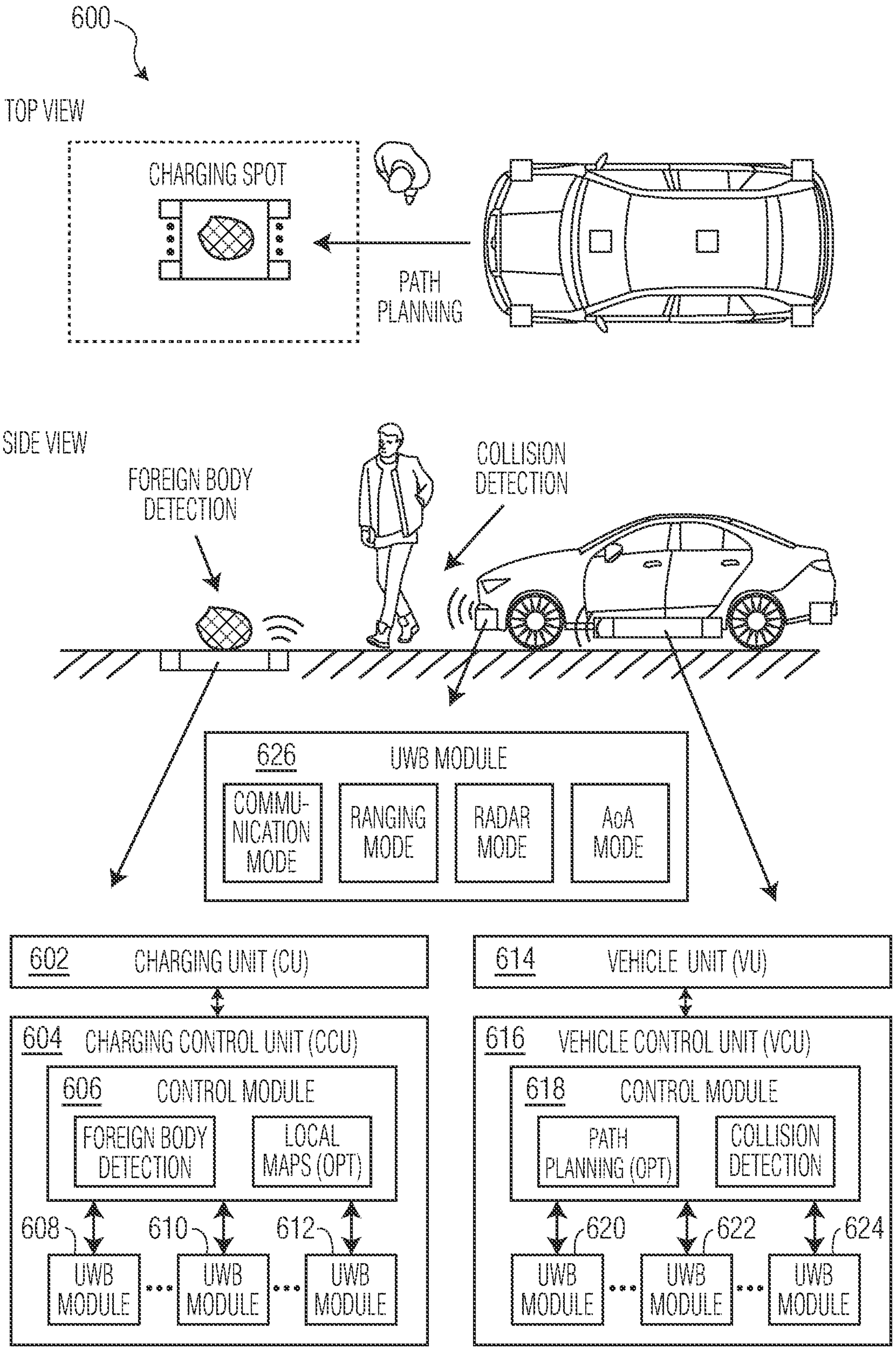
FIG. 6 shows an illustrative embodiment of a vehicle charging system.

FIG. 6 shows an illustrative embodiment of a vehicle charging system 600. In particular, an example is shown of a situation in which a vehicle approaches a charging unit. A system at the side of the vehicle and a system at the side of the charging station, which may be interrelated in the sense that they may interact with each other, support the execution of functions such as path planning, foreign body detection (FPD) and collision detection and avoidance. Accordingly, the vehicle charging system 600 contains a system at the side of the charging station, which includes a charging unit (CU) 602 and a charging control unit (CCU) 604. The charging control unit 604 comprises a control module 606 and a plurality of UWB modules 608, 610, 612. In accordance with the present disclosure, the control module 606 is configured to cause the UWB modules 608, 610, 612 to switch between a communication mode of operation, a ranging mode of operation and a radar mode of operation. Furthermore, the vehicle charging system 600 contains a system at the side of the vehicle, which includes a vehicle unit (VU) 614 and a vehicle control unit (VCU) 616. The vehicle control unit 616 comprises a control module 618 and a plurality of UWB modules 620, 622, 624. In accordance with the present disclosure, the control module 618 is configured to cause the UWB modules 620, 622, 624 to switch between a communication mode of operation, a ranging mode of operation and a radar mode of operation.

The charging unit 602 and the vehicle unit 614 perform the vehicle charging, i.e. they transfer electrical energy to the vehicle's batteries, which may be done wirelessly or in a conducted manner. In a conducted charging system, for example, the charging unit 602 may be comprised of a base and a movable arm which dock onto a conductor on the vehicle unit 614. The charging control unit 604 and the vehicle control unit 616 support the vehicle guidance procedure. Each of the charging control unit 604 and the vehicle control unit 616 comprises a control module coupled to multiple UWB modules 608, 610, 612, 620, 622, 624. A control module may contain algorithms for safe guidance of the vehicle to the charging spot. For example, the control module 618 of the VCU 616 may include a path planning algorithm which uses local maps of the charging facility (obtained from the CCU 604 after a connection has been established or from the parking infrastructure) for the guidance. The path planning does not necessarily have to be executed on the VCU 616 but could also be performed on path planning control units integrated in automated vehicles.

Multiple UWB modules may be used for the RF communication and localization between the CCU 604 and the VCU 616 and for the radar sensing operations. For this purpose, each module may be operated in a communication mode, a ranging mode, an angle-of-arrival mode, a radar mode, and any combination of those modes (e.g., in a combined ranging/radar mode). For instance, when a UWB module operates in a ranging mode, the transmitter of the module may transmit a frame comprising a SYNC field and a payload, and the receiver of the module may be turned off. Furthermore, when the UWB module operates in a combined ranging/radar mode, the following operations may be performed: the transmitter of the module transmits a frame comprising a SYNC field and a payload, the receiver of the module is turned on and receives the SYNC field reflected by the environment, the receiver is turned off after receiving the SYNC field, and the responder answers with a response message to finish the ranging procedure. During the guidance procedure a UWB module may be configured in any of those modes. In addition, a UWB module on the vehicle side may be part of the VCU 616 or of any existing vehicle anchors used for smart car access (e.g. anchors mounted inside the bumpers). Similarly, a UWB module on the charging unit 602 may be part of the CCU 604 or of any additional external infrastructure (e.g. UWB anchors mounted on a garage ceiling to enhance localization accuracy).

Figure 7:
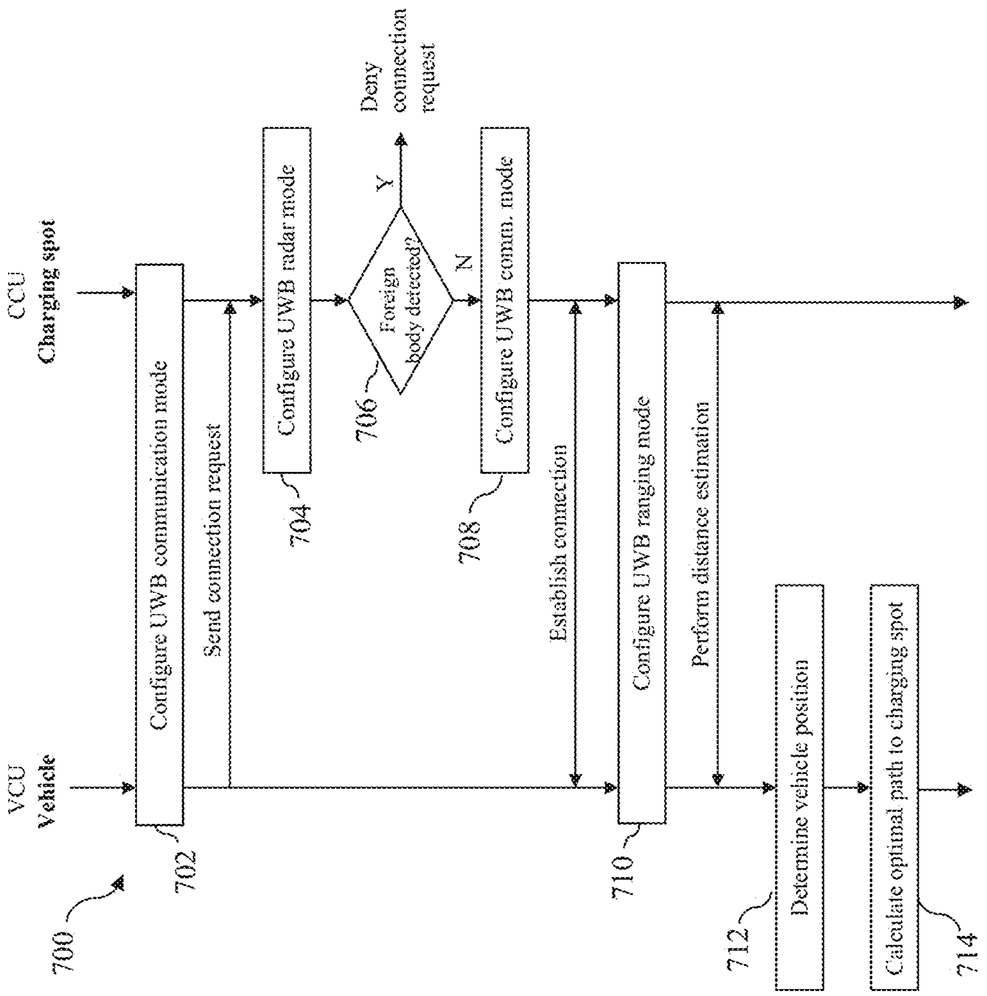
FIG. 7 shows an illustrative embodiment of a vehicle guiding method for use at a charging station.
Figure 7:
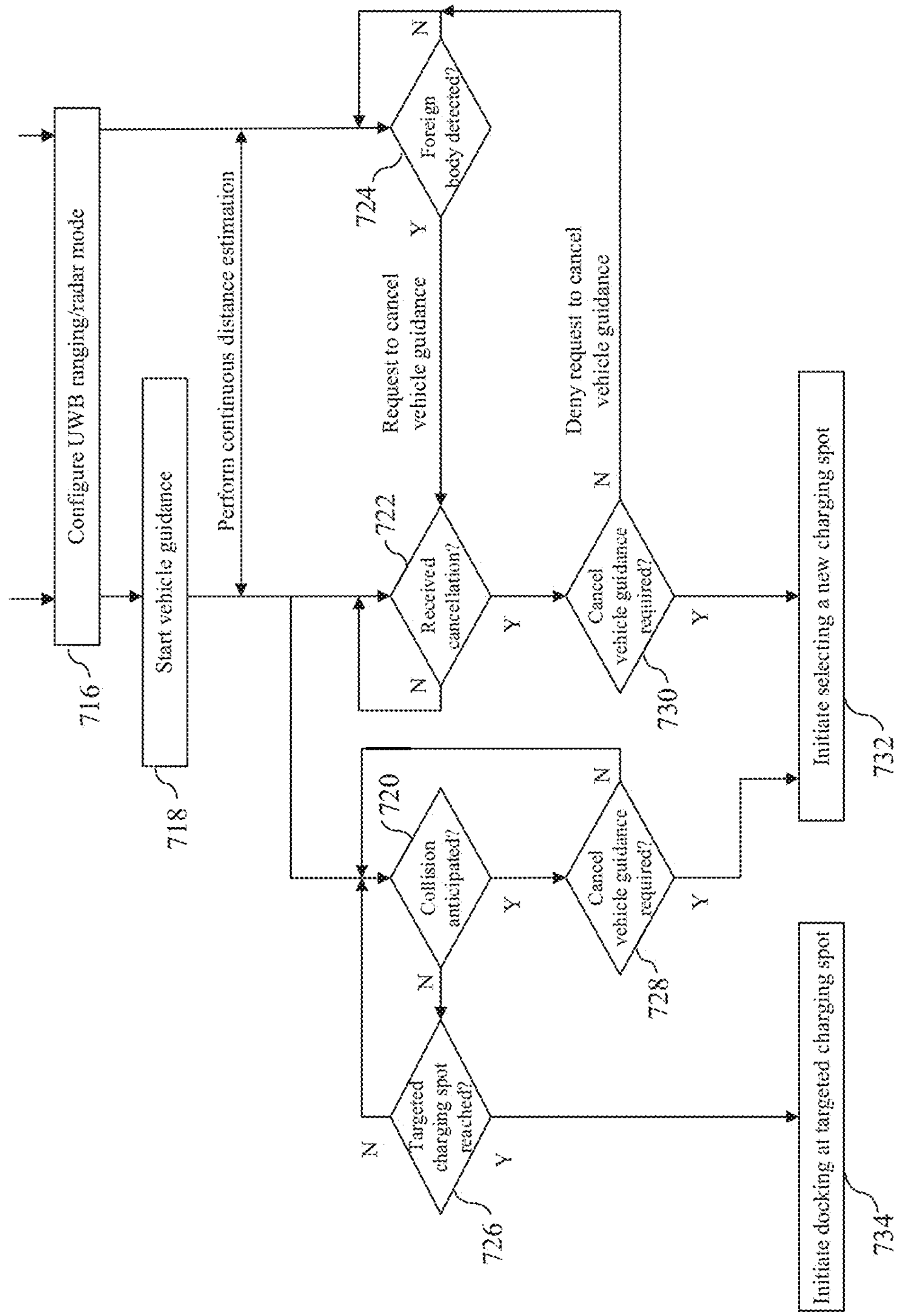

FIG. 7 shows an illustrative embodiment of a vehicle guiding method 700 for use at a charging station. In particular, a method 700 is shown in which a system included in a vehicle and a system installed at a predefined location, which is a charging location, interact with each other, to facilitate correctly and safely guiding the vehicle to said charging location. More specifically, an exemplary flow chart is shown for a guiding and sensing procedure involving the CCU and VCU depicted in FIG. 6.

The flow chart contains three main parts. The first part relates to the establishment of a connection between the VCU and the CCU. Initially, with the UWB modules configured 702 in the communication mode, the VCU sends a connection request to a CCU. Alternatively, the CCU may send a connection request to the VCU. Upon receiving the request, the UWB modules of the CCU are configured 704 in a radar mode, and the foreign body detection (FBD) algorithm checks 706 whether a foreign body blocks the charging spot (in which case the connection request is denied). If no foreign body is detected, the UWB modules of the CCU are reconfigured 708 in the communication mode, allowing the VCU to connect to the CCU. The establishment of this connection may include performing a secure authentication process, exchanging local map information for route planning, and performing other preparatory functions.

The second part of the flow chart relates to the localization of the vehicle. After successful connection, the UWB modules are configured 710 in a ranging mode to perform distance estimation between the CCU and VCU (the procedure used for ranging can for instance be double-sided two-way ranging (DS-TWR)). The VCU uses the range and/or angle information to determine 712 the position of the vehicle relative to the CCU. Optionally, also the CCU can estimate the position of the VCU and transmit the position information to the vehicle. Knowing the position, the VCU proceeds with estimating or calculating 714 the optimal path to the charging spot based on, for example, the previously received local map information.

The third part of the flow chart relates to guiding the vehicle to the charging spot. After computing the optimal path, the UWB modules of the CCU and the VCU are configured 716 in a combined ranging/radar mode, allowing them, during 718 the ensuing guidance procedure, to (i) perform continuous frame exchanges to update the determined vehicle position, (ii) anticipate a collision of the vehicle with e.g. a pedestrian, and (iii) detect a foreign body on the charging spot. If a collision is anticipated 720, it is determined 728 whether a cancellation of the vehicle guidance is required. If so, then the selection of a new charging spot is initiated 732. If no collision is anticipated, then the vehicle is guided until it is determined 726 that the targeted charging spot has been reached. If the targeted charging spot has been reached, then docking at the targeted charging spot is initiated 734. For example, the VU may dock to the CU to allow start of the charging process (e.g. in case of a conductive charging system). If a foreign body is detected 724 by the CCU, then the CCU sends a request to cancel the vehicle guidance to the VCU. If the VCU has received 722 a cancellation request, then it determines 730 whether a cancellation of the vehicle guidance is required. If so, then the selection of a new charging spot is initiated 732. If not, then the VCU denies the request from the CCU to cancel the vehicle guidance. It is noted that the path planning may also be done on the charging spot side (CCU), in which case no local map information needs to be sent to the VCU.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 vehicle charging site
102 vehicle
104 vehicle
106 vehicle
108 charging unit
110 charging unit
112 charging unit
200 vehicle including system for facilitating guiding the vehicle to a predefined location
202 controller
204 UWB communication node
206 UWB communication node
208 UWB communication node
210 UWB communication node
212 UWB communication node
300 method for facilitating guiding a vehicle to a predefined location
302 establishing, by one or more UWB communication units, UWB communication with a UWB-enabled system installed at a predefined location
304 controlling, by a controller, said UWB communication units, wherein the controller causes the UWB communication units to switch between a communication mode of operation, a ranging mode of operation and a radar mode of operation
400 system for facilitating guiding a vehicle to a predefined location
402 controller
404 UWB communication node
406 UWB communication node
408 UWB communication node
410 predefined location
500 method for facilitating guiding a vehicle to a predefined location
502 establishing, by one or more UWB communication units, UWB communication with a UWB-enabled system included in a vehicle
504 controlling, by a controller, said UWB communication units, wherein the controller causes the UWB communication units to switch between a communication mode of operation, a ranging mode of operation and a radar mode of operation
600 vehicle charging system
602 charging unit
604 charging control unit
606 control module
608 UWB module
610 UWB module
612 UWB module
614 vehicle unit
616 vehicle control unit
618 control module
620 UWB module
622 UWB module
624 UWB module
700 vehicle guiding method for use at a charging station
702 configure UWB communication mode
704 configure UWB radar mode
706 foreign body detected?
708 configure UWB communication mode
710 configure UWB ranging mode
712 determine vehicle position
714 calculate optimal path to charging spot
716 configure UWB ranging/radar mode
718 start vehicle guidance
720 collision anticipated?
722 received cancellation?
724 foreign body detected?
726 targeted charging spot reached?
728 cancel vehicle guidance required?
730 cancel vehicle guidance required?
732 initiate selecting a new charging spot
734 initiate docking at targeted charging spot

What is claimed is:

1. A system for facilitating guiding a vehicle to a predefined location, the system configured to be included in a vehicle and comprising:

one or more ultra-wideband (UWB) communication units coupled to the vehicle and configured to establish UWB communication with a UWB-enabled system installed at the predefined location;

a controller coupled to the vehicle and to the one or more UWB communication units, the controller configured to control the UWB communication units; and wherein the controller is configured to cause the UWB communication units to switch between a communication mode of operation for execution of authentication tasks, a ranging mode of operation to track a position and orientation of the vehicle relative to the predefined location, and a radar mode of operation to detect objects in a projected path of the vehicle; and wherein, after execution of authentication tasks and transaction related tasks using UWB communication units in the communication mode, the controller receives a local map of a facility from the UWB-enabled system and a projected path to a destination associated with the local map is determined, upon determining the projected path, the controller causes the UWB communication units to operate in a combined mode of operation in which the controller causes the UWB communication units to alternate between the ranging mode of operation to track the position of the vehicle and the radar mode of operation to determine objects in a projected path of the vehicle to navigate the vehicle to the destination.

2. The system of claim 1, wherein the controller is further configured to cause the UWB communication units to operate in the communication mode in order to establish a connection with the UWB-enabled system.

3. The system of claim 1, wherein the controller is further configured to cause the UWB communication units to operate in the ranging mode in order to determine a position of the vehicle.

4. The system of claim 3, wherein the controller is further configured to calculate a path from the vehicle to the predefined location based on the determined position of the vehicle.

5. The system of claim 1, wherein the controller is further configured to cause the UWB communication units to operate in a combined ranging and radar mode in order to guide the vehicle to the predefined location.

6. The system of claim 5, wherein the combined ranging and radar mode includes alternating between the ranging mode of operation and the radar mode of operation.

7. The system of claim 5, wherein the controller is further configured to predict a collision between the vehicle and an external object based on a detection of the external object by the UWB communication units when the UWB communication units operate in the radar mode.

8. A method for facilitating guiding a vehicle to a predefined location, comprising:
- controlling, by a controller of the vehicle, one or more ultra-wideband (UWB) communication units of the vehicle, to switch from one of a ranging mode of operation or a radar mode of operation to a communication mode of operation;
- establishing, by the one or more UWB communication units in the communication mode of operation, UWB communication with a UWB-enabled system installed at the predefined location;
- performing, via the UWB communication, at least one transaction-related task between the vehicle and the UWB-enabled system at the predefined location;
- receiving a local map of a facility from the UWB-enabled system and a projected path to a destination associated with the local map; and
- controlling, by the controller, the UWB communication units to switch from the communication mode of operation to a combined mode of operation in which the UWB communication units alternate between the ranging mode of operation to track a position and orientation of the vehicle and the radar mode of operation to detect objects in the projected path of the vehicle as the vehicle navigates to the destination.

9. A system for facilitating guiding a vehicle to a predefined location, the system configured to be installed at the predefined location and comprising:
- one or more ultra-wideband (UWB) communication units at the predefined location and configured to establish UWB communication with a UWB-enabled system included in the vehicle;
- a controller of the system at the predefined location and configured to control the one or more UWB communication units; and
- wherein the controller is configured to cause the UWB communication units to switch to a communication mode of operation to perform at least one transaction-related task between the system and the vehicle to identify and authenticate the vehicle and to provide a local map of a facility to the vehicle and a projected path to a destination associated with the local map and then to cause the UWB communication units to switch to a combined mode of operation in which the UWB communication units alternate between a ranging mode of operation to determine a position and orientation of the vehicle relative to the predefined location and a radar mode of operation to detect objects in the projected path of the vehicle.

10. The system of claim 9, wherein the controller is further configured to cause the UWB communication units to operate in the communication mode in order to establish a connection with the UWB-enabled system.

11. The system of claim 9, wherein the controller is further configured to cause the UWB communication units to operate in the ranging mode in order to determine a position of the vehicle.

12. The system of claim 9, wherein the controller is further configured to cause the UWB communication units to operate in the radar mode in order to detect an external object which is present near or at the predefined location.

13. A method for facilitating guiding a vehicle to a predefined location, comprising:
- controlling, by a controller of an ultra-wideband (UWB)-enabled system at the predefined location, one or more UWB communication units of the UWB system to switch from one of a ranging mode of operation or a radar mode of operation to a communication mode of operation;
- establishing, by the one or more UWB communication units in the communication mode of operation, UWB communication with a UWB-enabled system included in the vehicle;
- performing, via the UWB communication, at least one transaction-related task between the UWB-enabled system at the predefined location and the vehicle; and
- controlling, by the controller, the UWB communication units, wherein after performing the at least one transaction-related task in the communication mode of operation, the controller causes the UWB communication units to communicate a local map of a facility to the vehicle and a projected path to a destination associated with the local map and to selectively switch from the communication mode of operation to a combined mode of operation in which the UWB communication units alternate between the ranging mode of operation to determine a position and orientation of the vehicle relative to the UWB-enabled system at the pre-defined location and the radar mode of operation to detect objects in the projected path of the vehicle.

14. The system of claim 2, wherein the controller is further configured to cause the UWB communication units to operate in the ranging mode in order to determine a position of the vehicle relative to a charging station.

15. The system of claim 2, wherein the controller is further configured to cause the UWB communication units to operate in a combined ranging and radar mode in order to guide the vehicle to the predefined location.

16. The system of claim 6, wherein the controller is further configured to predict a collision between the vehicle and an external object based on a detection of the external object by the UWB communication units when the UWB communication units operate in the radar mode.

17. The system of claim 10, wherein the controller is further configured to cause the UWB communication units to operate in the ranging mode in order to determine a position of the vehicle relative to multiple modules of the UWB-enabled system, wherein the UWB-enabled system comprises a charging station.

18. The system of claim 11, wherein the controller is further configured to cause the UWB communication units to operate in the radar mode in order to detect an external object which is present near or at the predefined location.

* * * * *